United States Patent
Ciminelli

(10) Patent No.: US 7,502,632 B2
(45) Date of Patent: Mar. 10, 2009

(54) TEXT MESSAGING DEVICE

(75) Inventor: Gabriele Ciminelli, Tokyo (JP)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/875,607

(22) Filed: Jun. 25, 2004

(65) Prior Publication Data

US 2006/0009964 A1    Jan. 12, 2006

(51) Int. Cl.
   *H04B 1/38*    (2006.01)
(52) U.S. Cl. .................. 455/563; 455/466; 455/566; 455/575.1; 704/2; 704/8; 704/231; 345/171
(58) Field of Classification Search ............. 455/466, 455/566, 550.1, 457, 575.1; 345/169–171; 704/1, 277, 127, 8, 2; 715/541, 536
   See application file for complete search history.

(56) References Cited

U.S. PATENT DOCUMENTS

| | | | |
|---|---|---|---|
| 4,882,681 A * | 11/1989 | Brotz ........................... 704/3 |
| 5,119,296 A * | 6/1992 | Zheng et al. ................ 715/535 |
| 5,307,267 A * | 4/1994 | Yang .......................... 715/535 |
| 5,410,306 A * | 4/1995 | Ye ............................... 341/28 |
| 5,903,859 A * | 5/1999 | Stone et al. .................... 704/8 |
| 5,905,964 A * | 5/1999 | Sudo .......................... 455/566 |
| 5,913,185 A * | 6/1999 | Martino et al. ................. 704/8 |
| 5,920,826 A * | 7/1999 | Metso et al. ................ 455/557 |
| 6,094,666 A * | 7/2000 | Li ............................... 715/535 |
| 6,161,116 A * | 12/2000 | Saltzman ................... 715/262 |
| 6,167,287 A * | 12/2000 | Chozui ...................... 455/566 |
| 6,198,948 B1 * | 3/2001 | Sudo et al. ................. 455/566 |
| 6,362,752 B1 * | 3/2002 | Guo et al. ..................... 341/28 |
| 6,473,621 B1 * | 10/2002 | Heie .......................... 455/466 |
| 6,487,424 B1 * | 11/2002 | Kraft et al. ................. 455/566 |
| 6,771,982 B1 * | 8/2004 | Toupin ....................... 455/557 |
| 6,788,962 B2 * | 9/2004 | Cha .......................... 455/566 |
| 6,810,272 B2 * | 10/2004 | Kraft et al. ................. 455/566 |
| 6,973,332 B2 * | 12/2005 | Mirkin et al. .............. 455/566 |
| 7,047,047 B2 * | 5/2006 | Acero et al. ................ 455/563 |
| 7,162,412 B2 * | 1/2007 | Yamada et al. ................ 704/7 |

(Continued)

FOREIGN PATENT DOCUMENTS

JP         2-244376         9/1990

(Continued)

OTHER PUBLICATIONS

Hiroko Murakami, New Function Guide for Microsoft Office 2000, the first edition, NEC Media Product Ltd., Oct. 17, 1999, p. 184, a total of 2 pages including English translation of this document.

(Continued)

*Primary Examiner*—Sharad Rampuria
(74) *Attorney, Agent, or Firm*—Squire, Sanders & Dempsey, LLP

(57) ABSTRACT

A hand-held wireless communication device for creating and sending text messages including ideograms, said communication device including: an input interface for a user to make a phonetic input; and a processor for controlling a display device so as to display thereon one or more ideogrammatic representations of said phonetic input according to a first language, which are each selectable by the user for incorporation into a text message according to further information relating thereto in a second language.

18 Claims, 3 Drawing Sheets

U.S. PATENT DOCUMENTS

| | | | |
|---|---|---|---|
| 7,197,331 B2* | 3/2007 | Anastasakos et al. | 455/557 |
| 2002/0077143 A1* | 6/2002 | Sharif et al. | 455/550 |
| 2003/0017858 A1* | 1/2003 | Kraft et al. | 455/566 |
| 2003/0236658 A1* | 12/2003 | Yam | 704/2 |
| 2004/0210438 A1* | 10/2004 | Gillick et al. | 704/254 |

FOREIGN PATENT DOCUMENTS

| | | |
|---|---|---|
| JP | 2000-331014 | 11/2000 |

OTHER PUBLICATIONS

English translation of the Japanese Office Action dated May 23, 2007, a total of 4 pages.

English translation of the cited sections of prior art references (CN85101047A and CN1042616A), a total of 3 pages.

English translation of the Chinese Office Action dated Jun. 8, 2007, a total of 5 pages.

Inouke, Mika, "First step guide of CLIE, from basic operation to communication setting for NX series", Mobile Press, Technical Review Co., Feb. 24, 2003, vol. 3, No. 1, pp. 44-51.

Kitayuguchi, Yukari, "Learning and using English by personal computer", Nikkei PC beginners, Nikkei BP Co., Jun. 13, 2003, vol. 8, No. 12, pp. 42-47.

* cited by examiner

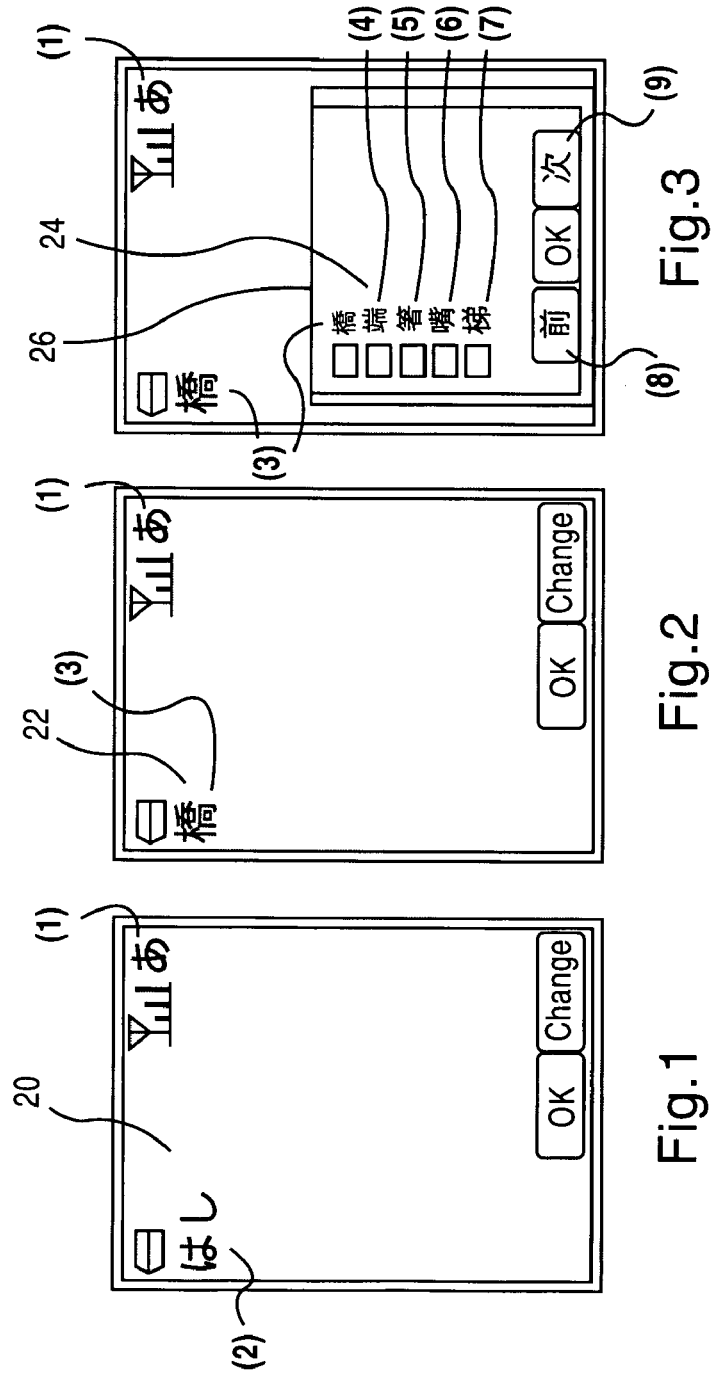

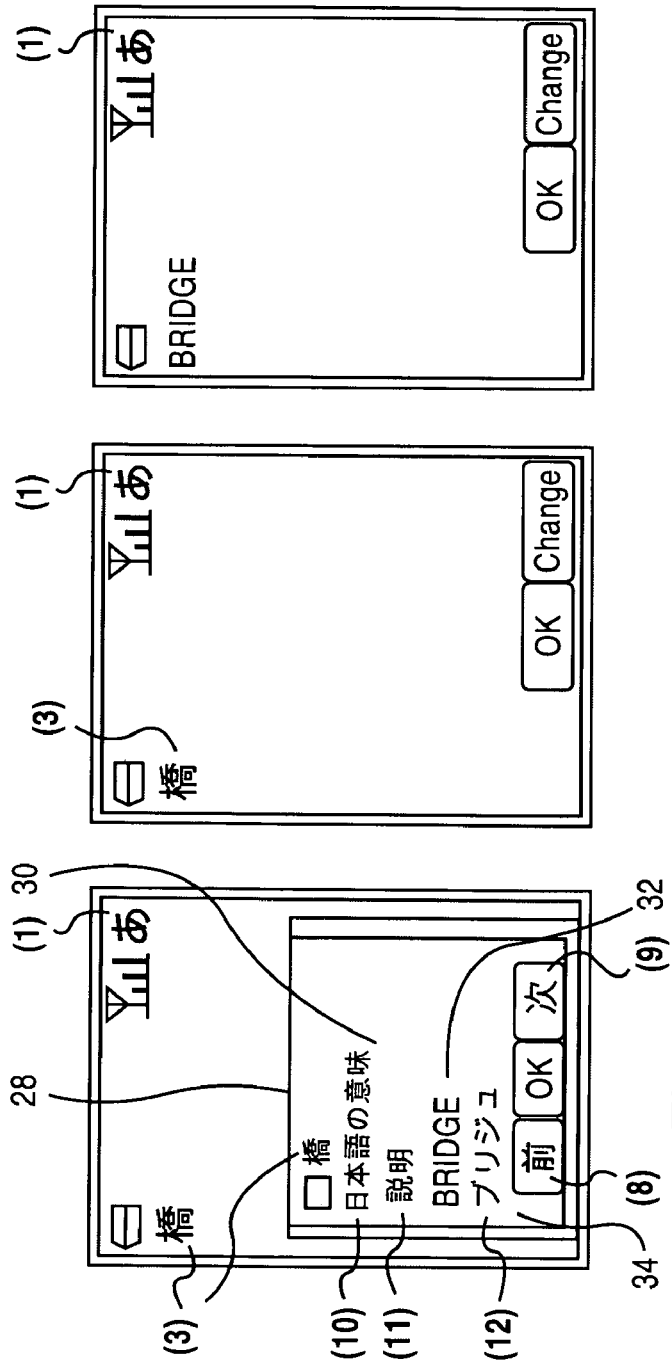

TEXT MESSAGING DEVICE

FIELD OF THE INVENTION

The present invention relates to hand-held wireless communication devices with which text messages can be created and sent.

BACKGROUND OF THE INVENTION

The creation of text messages via the keypad of a hand-held wireless telephone in many European languages is relatively simple since all the 26 letters of the Roman alphabet can be represented on the keys of a standard phone keypad. However, some languages such as Chinese and Japanese use thousands of ideograms, some of which have the same readings as others. A common way of creating text messages including such ideograms is to make a phonetic input using a conventional keypad and then commanding a processor to list one or more ideogrammatic representations corresponding to such phonetic input. The user then selects the desired ideogrammatic representation for incorporation into the text message.

SUMMARY OF THE INVENTION

It is an aim of the present invention to expand the functionality and/or utility of such hand-held text messaging devices.

According to a first aspect of the present invention, there is provided a hand-held wireless communication device for creating and sending text messages including ideograms, said communication device including: an input interface for a user to make a phonetic input; and a processor for controlling a display device so as to display thereon one or more ideogrammatic representations of said phonetic input according to a first language, which are each selectable by the user for incorporation into a text message according to further information relating thereto in a second language.

According to a second aspect of the present invention, there is provided a hand-held wireless communication device for creating and sending text messages including ideograms, said communication device including: an input interface for a user to make a phonetic input; and a processor for controlling a display device so as to display thereon one or more ideogrammatic representations of said phonetic input according to a first language, which are each selectable by the user for incorporation into a text message according to further information in the first language.

The present invention expands the functionality/utility of a text messaging device by making the ideogrammatic representation (for example, representations including one or more "kanji" characters in the case of Japanese) selectable according to further information relating thereto in the first language or a second language.

In one embodiment, the further information includes a second language (for example, English) equivalent thereof. As well as assisting the selection of the correct ideogrammatic representation for incorporation into a text message, such embodiment also (a) facilitates the learning of ideograms, and (b) facilitates the learning of the second language.

The phonetic input can, for example, be made via a conventional keypad on the basis of the letters of the Roman alphabet according to any one or more of the Hepburn, Kunrei or Nippon systems in the case of Japanese and according to the pinyin system in the case of Chinese. Typically the 26 letters of the Roman alphabet would be printed in groups of two and three on the number keys of a conventional keypad, and the desired letters would be input by pressing the respective key one, two, or three times depending on the position of the desired letter in the respective group. In the case of Japanese, a device according to one embodiment of the device would then display the phonetic input as Japanese "hiragana" phonetic symbols.

BRIEF DESCRIPTION OF THE DRAWINGS

An embodiment of the present invention shall now be described, by way of example only, with reference to the accompanying drawings, in which:

FIGS. 1 to 6 are display images explaining the operation of a device according to an embodiment of the present invention;

DESCRIPTION OF PREFERRED EMBODIMENTS

By way of example, a hand-held wireless communication device (mobile telephone) according to an embodiment of the present invention will be described for the case where the first language is Japanese and the second language is English. As mentioned above, thousands of ideograms known as "kanji" are used in Japanese.

The phonetic input can, for example, be made via a conventional keypad 2 on the basis of a romanisation system such as the Hepburn, Kunrei or Nippon systems in the case of Japanese and the pinyin system in the case of Chinese. Typically the 26 letters of the Latin alphabet would be printed in groups of three and four on the number keys of a conventional keypad, and the desired letters would be input by pressing the respective key one, two, three or four times depending on the position of the desired letter in the respective group. In the case of Japanese, one embodiment of the device would then display the phonetic input as Japanese "hiragana" phonetic symbols.

Figure 7:
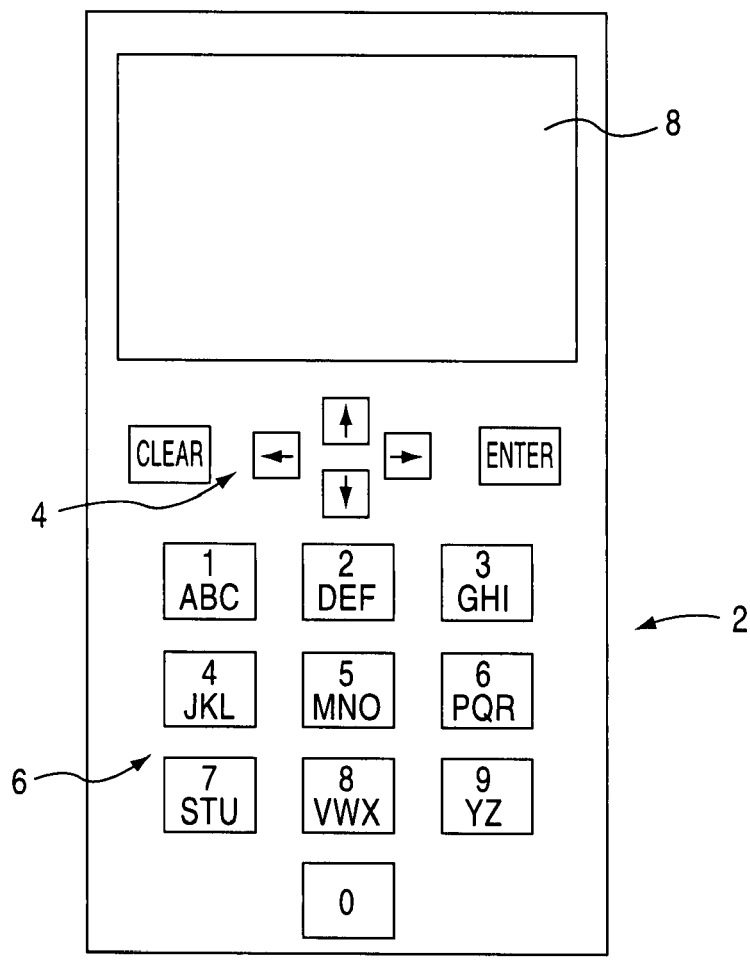
FIG. 7 shows an external view of a device by which the operation explained in FIGS. 1 to 6 can be effected by a user.
Figure 8:
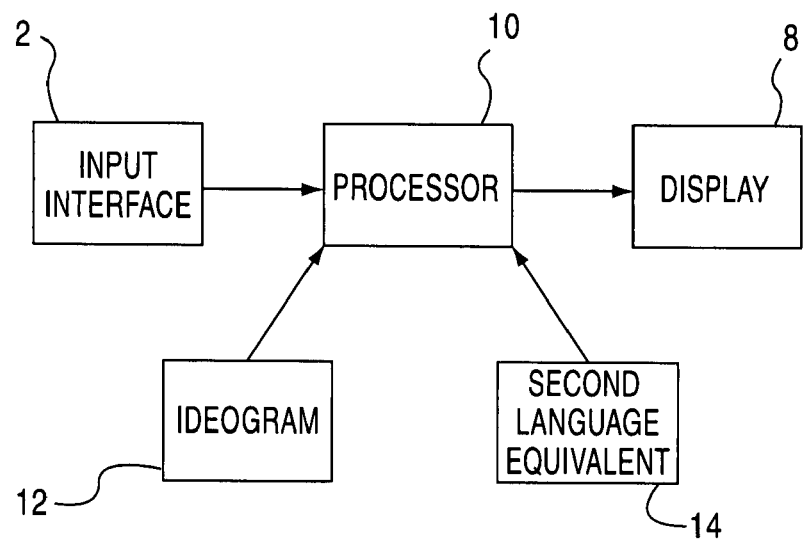
FIG. 8 is a schematic view of the components of a device according to an embodiment of the present invention.

As an example, we shall describe the case where a user wishes to include the Japanese "kanji" character meaning bridge (or its English equivalent) into a text message. With reference to FIG. 7, a user makes a phonetic input by pressing in order the "3" key twice for "H", the "1" key once for "A", the "7" key once for "S", the "3" key twice for another "H" and the "3" key three more times for "I". "HASHI" is the phonetic representation of the Japanese word meaning bridge according to the Hepburn system. As shown in FIG. 1, this phonetic input is displayed via the display device 8 (such as a liquid crystal display device) in the Japanese phonetic symbols known as "hiragana" 20. The user could retain these "hiragana" symbols in the text message or, as in this example, can convert them into a symbol or a set of symbols including one or more Japanese "kanji" characters. Pressing the down-arrow key once has the effect of instructing the device processor 10 to locate from a data storage device 12 and display a symbol or set of symbols including one or more "kanji" characters corresponding to the phonetic input (FIG. 2). This option is indicated by the down-arrow sign shown in the navigation indicator at the top right of the display. The symbol or set of symbols displayed by thus pressing the down-key once is known as the "default" and is typically the most common symbol or set of symbols corresponding to the phonetic input. In this example, it is the single "kanji" character meaning "bridge" in Japanese that is displayed 22.

However, the "default" may not always be the symbol or set of symbols that the user wishes to incorporate into the text message. Pressing the down-arrow key on the key-pad a second time (as indicated by the down-arrow sign in the navigation indicator in FIG. 2) has the effect of instructing the processor 10 to locate from data storage device 12 and display (FIG. 3) in a pop-up window 26 a list 24 of alternative symbols or sets of symbols including "kanji" characters that correspond to the phonetic input. The user can then select a specific member of the list by pressing once the number key corresponding to the number shown at the left thereof or can scroll up and down the list using the up and down arrow keys (as suggested by the up and down arrows keys in the navigation indicator). When a member of the list is thus selected, pressing the right-arrow key shown in the navigation indicator in FIG. 3 has the effect of instructing the processor to locate from a data storage device 14 and display (FIG. 4) in another pop-up window 28 (i) an explanation 30 of the "kanji" character or combination in Japanese, (ii) the English equivalent 32, and (iii) an indication 34 of the pronunciation of the English equivalent in Japanese phonetic symbols such as "katakana". As shown in FIG. 4, the English equivalent is highlighted indicating that it is selectable for insertion into the text message (as shown in FIG. 6) by for example pressing the "enter" key on the keypad. As shown in FIG. 4, the pop-up window displaying the further information regarding the selected "kanji" character or combination is accompanied by the display of a back-arrow sign at the navigation indicator indicating that the user can return to the list of "kanji" characters or combinations shown in FIG. 3 by pressing the back-arrow key. The user would use this option where, for example, it is clear from the further information that he or she has selected the wrong "kanji" character or combination. Alternatively, this can be done by pressing the "clear" key. When the user has identified the desired "kanji" character or combination, the user can select it for insertion into the text message as shown in FIG. 5 and can continue with the creation of the text message by making a another phonetic input.

Where the pop-up window shown in FIG. 4 is not large enough to display simultaneously all the available further information and the user needs to scroll down in order to access it all, an appropriate indication to this effect is preferably displayed, such as a down-arrow at the navigation indicator.

In the example given above, the ideogrammatic representations shown are all single "kanji" characters. However, for some phonetic inputs, the corresponding ideogrammatic representations may include combinations of "kanji" characters, and/or combinations of "kanji" characters and phonetic symbols such as "hiragana".

The above-described device has the following advantages. (1) It facilitates the identification of difficult "kanji" characters, and also facilitates the learning of new "kanji" characters by, for example, Japanese school students or foreign students of Japanese. (2) It facilitates the learning of the English language by Japanese users; (3) it facilitates the creation of mixed language text messages; and (4) it facilitates the learning of the pronunciation of English words by Japanese users.

The above-described device thus offers language flexibility and multi-language features which can be very useful not only for Japanese, but also for other languages that use ideograms such as Chinese. For the Chinese language, the phonetic input can be made according to the pinyin system which also uses the Roman alphabet.

In the example given above, the desired ideogrammatic representation is selectable according to an English language equivalent thereof. In an alternative embodiment, the further information in the English language is simply of a level sufficient to differentiate the respective ideogrammatic representation from any others presented for the same phonetic input. For example, the further information could simply be an indication of the general meaning of one or more kanji characters or combinations of kanji characters included in the respective ideogrammatic representation.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

What is claimed is:

1. An apparatus, comprising:
   an input interface for a user to make a phonetic input; and
   a processor configured to control a display device so as to display thereon one or more ideogrammatic representations of said phonetic input according to a first language, and configured to provide further information in a second language different to said first language and according to which said ideogrammatic representations are each selectable by the user for incorporation into a text message,
   wherein said further information comprises information other than a representation of the phonetic input in a script of the second language, and
   wherein said further information comprises a second language equivalent and the pronunciation of said second language equivalent.

2. A apparatus according to claim 1, wherein the one or more ideogrammatic representations are first displayed without said further information, and one or more of the displayed ideogrammatic representations are selectable via the input interface so as to access said further information relating thereto.

3. A apparatus according to claim 1, wherein said second language equivalent is displayable via the display device and is then selectable via said input interface for incorporation into a text message.

4. A apparatus according to claim 1, wherein said processor is configured to control said display device so as to first display a single ideogrammatic representation corresponding to said phonetic input together with, if applicable, an indication that a list of other such ideogrammatic representations is also accessible for viewing by operating said input interface.

5. A apparatus according to claim 2, wherein said processor is configured to control said display so as to provide an indication that said further information relating to each of said displayed ideogrammatic representations is accessible for viewing by the user by operating said input interface.

6. A apparatus according to claim 5, wherein said input interface comprises an array of keys that are operable by a user, and said indication comprises a representation of a selected one of said array of keys whose operation provides access to said further information.

7. A apparatus according to claim 1, wherein said pronunciation is visually displayable in phonetic symbols via the display device.

8. A apparatus according to claim 1, wherein the input interface comprises an array of keys operable by a user.

9. A apparatus according to claim 8, wherein said phonetic input is made by operating one or a combination of said array of keys.

10. A apparatus according to claim 1, wherein said further information is displayable via said display device.

11. A apparatus according to claim 1, wherein said first language is Japanese or Chinese and the phonetic input is made at least partly according to a romanisation system.

12. A apparatus according to claim 1, wherein said second language is English.

13. An apparatus, comprising:
an input interface for a user to make a phonetic input; and
a processor configured to control a display device so as to display thereon one or more ideogrammatic representations of said phonetic input according to a first language, and configured to provide further information in a second language different to said first language and according to which said ideogrammatic representations are each selectable by the user for incorporation into a text message,
wherein said further information comprises an indication in said second language of the meaning of the respective ideogrammatic representation, and
wherein said further information comprises a second language equivalent and the pronunciation of said second language equivalent.

14. A method, comprising:
receiving a phonetic input on an input interface; and
controlling a display device with a processor so as to display thereon one or more ideogrammatic representations of said phonetic input according to a first language, and for providing further information in a second language different to said first language and according to which said ideogrammatic representations are each selectable by the user for incorporation into a text message,
wherein the further information includes information other than a representation of the phonetic input in a script of the second language, and
wherein said further information comprises a second language equivalent and the pronunciation of said second language equivalent.

15. An apparatus, comprising:
input means for a user to make a phonetic input; and
processor means for controlling a display device so as to display thereon one or more ideogrammatic representations of said phonetic input according to a first language, and for providing further information in a second language different to said first language and according to which said ideogrammatic representations are each selectable by the user for incorporation into a text message,
wherein the further information includes an indication in said second language of the meaning of the respective ideogrammatic representation, and
wherein said further information comprises a second language equivalent and the pronunciation of said second language equivalent.

16. A method, comprising:
receiving a phonetic input on an input interface; and
controlling a display device with a processor so as to display thereon one or more ideogrammatic representations of said phonetic input according to a first language, and for providing further information in a second language different to said first language and according to which said ideogrammatic representations are each selectable by the user for incorporation into a text message,
wherein the further information includes an indication in the second language of the meaning of the respective ideogrammatic representation, and
wherein said further information comprises a second language equivalent and the pronunciation of said second language equivalent.

17. An apparatus, comprising:
input means for a user to make a phonetic input; and
processor means for controlling a display device so as to display thereon one or more ideogrammatic representations of said phonetic input according to a first language, and for providing further information in a second language different to said first language according to which said ideogrammatic representations are each selectable by the user for incorporation into a text message,
wherein the further information includes an indication in said second language of the meaning of the respective ideogrammatic representation, and
wherein said further information comprises a second language equivalent and the pronunciation of said second language equivalent.

18. An apparatus configured to:
allow a user to make a phonetic input;
display one or more ideogrammatic representations of said phonetic input according to a first language, and
provide further information provided in a second language different to said first language, wherein said further information comprises information other than a representation of the phonetic input in a script of the second language, and wherein said further information comprises a second language equivalent and the pronunciation of said second language equivalent; and
allow a user to select according to said further information and for incorporation into a text message one of said one or more ideogrammatic representations.

* * * * *